United States Patent
Shalamberidze et al.

(10) Patent No.: US 12,159,393 B2
(45) Date of Patent: Dec. 3, 2024

(54) METHODS AND APPARATUS FOR GRADING IMAGES OF COLLECTABLES USING IMAGE SEGMENTATION AND IMAGE ANALYSIS

(71) Applicant: Collectors Universe, Inc., Santa Ana, CA (US)

(72) Inventors: David Shalamberidze, Bethesda, MD (US); Kevin C. Lenane, Stony Brook, NY (US)

(73) Assignee: Collectors Universe, Inc., Santa Ana, CA (US)

( * ) Notice: Subject to any disclaimer, the term of this patent is extended or adjusted under 35 U.S.C. 154(b) by 208 days.

(21) Appl. No.: 17/674,328

(22) Filed: Feb. 17, 2022

(65) Prior Publication Data
US 2022/0261984 A1 Aug. 18, 2022

Related U.S. Application Data

(60) Provisional application No. 63/150,793, filed on Feb. 18, 2021.

(51) Int. Cl.
*G06K 9/00* (2022.01)
*G06T 3/40* (2006.01)
(Continued)

(52) U.S. Cl.
CPC .............. *G06T 7/0008* (2013.01); *G06T 3/40* (2013.01); *G06V 10/764* (2022.01); *G06T 2207/20081* (2013.01); *G06T 2207/20084* (2013.01)

(58) Field of Classification Search
CPC .......................................... G06T 2207/20084
See application file for complete search history.

(56) References Cited

U.S. PATENT DOCUMENTS

| | | |
|---|---|---|
| 4,899,392 A | 2/1990 | Merton |
| 5,133,019 A | 7/1992 | Merton et al. |

(Continued)

FOREIGN PATENT DOCUMENTS

| | | |
|---|---|---|
| KR | 20130061567 A | 6/2013 |
| WO | WO-2015080669 A1 | 6/2015 |

(Continued)

OTHER PUBLICATIONS

Alake, Richmond. "Deep Learning: Understanding The Inception Module". Towards Data Science, Dec. 22, 2020, https://towardsdatascience.com/deep-learning-understand-the-inception-module-56146866e652, 13 pages.

(Continued)

*Primary Examiner* — Hadi Akhavannik
(74) *Attorney, Agent, or Firm* — COOLEY LLP

(57) ABSTRACT

In some embodiments, a method can include augmenting a set of images of collectables to generate a set of synthetic images of collectables. The method can further include combining the set of images of collectables and the set of synthetic images of collectables to produce a training set. The method can further include training a set of machine learning models based on the training set. Each machine learning model from the set of machine learning models can generate a grade for an image attribute from a set of image attributes. The set of image attributes can include an edge, a corner, a center, or a surface. The method can further include executing, after training, the set of machine learning models to generate a set of grades for an image of collectable not included in the training set.

20 Claims, 8 Drawing Sheets

(51) Int. Cl.
*G06T 7/00* (2017.01)
*G06V 10/764* (2022.01)

(56) References Cited

U.S. PATENT DOCUMENTS

| | | | |
|---|---|---|---|
| 5,220,614 | A | 6/1993 | Crain |
| 5,224,176 | A | 6/1993 | Crain |
| 6,239,867 | B1 | 5/2001 | Aggarwal |
| 6,295,750 | B1 | 10/2001 | Harwell et al. |
| 6,726,205 | B1 | 4/2004 | Purton |
| 7,119,689 | B2 | 10/2006 | Mallett et al. |
| 7,660,468 | B2 | 2/2010 | Gokturk et al. |
| 8,234,185 | B2 | 7/2012 | Davis |
| 8,626,600 | B2 | 1/2014 | Yankovich et al. |
| 8,977,603 | B2 | 3/2015 | Pate et al. |
| 9,050,719 | B2 | 6/2015 | Valpola et al. |
| 9,538,149 | B2 | 1/2017 | Williams et al. |
| 9,672,551 | B2 | 6/2017 | Pate et al. |
| 9,679,319 | B2 | 6/2017 | Yankovich et al. |
| 9,767,163 | B2 | 9/2017 | Kass et al. |
| 10,104,197 | B2 | 10/2018 | Williams et al. |
| 10,146,841 | B2 | 12/2018 | Kass et al. |
| 10,229,445 | B2 | 3/2019 | Pate et al. |
| 10,360,531 | B1 | 7/2019 | Stallman et al. |
| 10,445,330 | B2 | 10/2019 | Kass et al. |
| 10,459,931 | B2 | 10/2019 | Kass et al. |
| 10,470,740 | B2 | 11/2019 | Freudenberger et al. |
| 10,500,735 | B1 | 12/2019 | Menon et al. |
| 10,525,599 | B1 | 1/2020 | Zutshi |
| 10,561,469 | B2 | 2/2020 | Kasai et al. |
| 10,630,805 | B2 | 4/2020 | Williams et al. |
| 10,753,882 | B1* | 8/2020 | Mahajan .................. H04N 7/18 |
| 10,942,933 | B2 | 3/2021 | Kass et al. |
| 2005/0197853 | A1 | 9/2005 | Ueno |
| 2007/0279494 | A1* | 12/2007 | Aman .................... G06V 20/40 |
| | | | 348/169 |
| 2008/0023343 | A1 | 1/2008 | Macor |
| 2008/0023351 | A1 | 1/2008 | Macor |
| 2010/0088168 | A1 | 4/2010 | Sullivan et al. |
| 2014/0083243 | A1 | 3/2014 | Morrow |
| 2014/0279527 | A1* | 9/2014 | Duke ................. G06Q 20/4016 |
| | | | 705/44 |
| 2015/0117701 | A1 | 4/2015 | Ross et al. |
| 2016/0210734 | A1* | 7/2016 | Kass ....................... G06T 7/001 |
| 2017/0343481 | A1* | 11/2017 | Jahanshahi ............ G06N 20/00 |
| 2018/0268378 | A1 | 9/2018 | Liu et al. |
| 2019/0205959 | A1 | 7/2019 | Pate et al. |
| 2019/0392457 | A1 | 12/2019 | Kuntagod et al. |
| 2020/0193666 | A1* | 6/2020 | Cinnamon ............ G06T 1/0007 |
| 2020/0193866 | A1* | 6/2020 | Kubota .............. G09B 19/0038 |
| 2021/0042797 | A1 | 2/2021 | Shamiss et al. |
| 2021/0065353 | A1 | 3/2021 | Potter et al. |
| 2021/0158274 | A1 | 5/2021 | Patchen |
| 2021/0201039 | A1 | 7/2021 | Frei et al. |
| 2021/0304559 | A1 | 9/2021 | Cupersmith et al. |
| 2022/0036371 | A1 | 2/2022 | Frisbee et al. |
| 2022/0374946 | A1 | 11/2022 | Kass et al. |
| 2023/0252532 | A1 | 8/2023 | Isakov et al. |
| 2024/0066910 | A1 | 2/2024 | Kass et al. |

FOREIGN PATENT DOCUMENTS

| | | |
|---|---|---|
| WO | WO-2022026924 | 2/2022 |
| WO | WO-2022178270 A1 | 8/2022 |

OTHER PUBLICATIONS

[Author Unknown] Imagenet Overview, 2016, Stanford Vision Lab, Stanford University, Princeton University, https://web.archive.org/web/20210125211537/http://image-net.org/about-overview, 1 page.
Feng, Vincent. "An Overview of ResNet and its Variants". Towards Data Science, Jul. 15, 2017, https://towardsdatascience.com/an-overview-of-resnet-and-its-variants-5281e2f56035, 18 pages.
Nepal, Prabin. "VGGNet Architecture Explained". Analytics Vidhya, Jul. 30, 2020, https://medium.com/analytics-vidhya/vggnet-architecture-explained-e5c7318aa5b6, 5 pages.
Simonyan and Zisserman. "Very Deep Convolutional Networks for Large-Scale Image Recognition". arXiv preprint arXiv:1409.1556, Apr. 10, 2015, 14 pages.
He, Kaiming et al. "Deep Residual Learning for Image Recognition". arXiv:1512.03385, Dec. 10, 2015, 12 pages.
[Author Unknown] "Computerized Grading?", Collectors Universe, Aug. 22, 2004, Retrieved online https://forums.collectors.com/discussion/comment/2670306/#Comment_2670306 on Sep. 7, 2023, 7 pages.
[Author Unknown] "The World's FIRST Online Grading Service", Online Grading Services, LLC, Dec. 1, 2002, Retrieved online https://web.archive.org/web/20021201042357/ http://www.ogscard.com:80/ on Sep. 14, 2023, 1 page.
[Author Unknown] "Welcome to the CTA Grading Experts Website", CTA Grading Experts, Feb. 3, 2006, Retrieved online https://web.archive.org/web/20060203013241/ http:/ctagradingexperts.com/ on Sep. 25, 2023, 1 page.
[Author Unknown] "Your Grading Company for the new Millennium", CTA Grading Experts, Feb. 13, 2006, Retrieved online https://web.archive.org/web/20060213014751/ http:/www.ctagradingexperts.com/ctaflash.html on Sep. 25, 2023, 3 pages.
Crisp, S., "How To Grade A Baseball Card: Everything You Ever Wanted To Know", Ultimate Team Set, Mar. 2, 2015, http://ultimateteamset.com/howtogradeabaseballcard.html, Retrieved online on Sep. 7, 2023, and https://web.archive.org/web/*/ http:/ultimateteamset.com/howtogradeabaseballcard.html*, Retrieved on Sep. 27, 2023, 14 pages.
International Preliminary Report on Patentability for International Application No. PCT/US2022/017010, mailed Aug. 31, 2023, 9 pages.
Basset, "Machine assisted visual grading of rare collectibles over the Internet", Western Connecticut State University, 2003, 12 pages.
International Search Report and Written Opinion for International Application No. PCT/US2022/017010, mailed Jun. 10, 2022, 10 pages.
Bassett, R.A., "Machine Assisted Grading of Rare Collectibles through the COINS framework". Dissertation, School of Computer Science and Information Systems, Pace University, Jul. 24, 2003, 194 pages.
Halperin, J., "Computer Grading". CoinGrading.com (1999); https://coingrading.com/compgrade1.html, Retrieved on Jul. 20, 2023, 2 pages.
Lagerstrom, R., et al., "Objective Image Based Grading Of Opal Gemstones". The 2010 International Conference on Image Processing, Computer Vision, and Pattern Recognition, Las Vegas, Nevada, USA, Jul. 12-15, 2010, https://publications.csiro.au/publications/publication/Plcsiro:EP101733, Retrieved on Jul. 20, 2023, 2 pages.
Author Unknown, "CoinManage 2006: Getting Started Guide," Liberty Street Software, 2006, 53 pages.
Author Unknown, "2012 Topps Classic Walk-Offs, Professional Sports Authenticator," Sep. 15, 2015, Retrieved online https://web.archive.org/web/20150915013815/http:/www.psacard.com/Pop/Detail.aspx?c=102355, 1 page.
Author Unknown, "Diamonds," Goldsmith Jewelers, Jan. 10, 2007, Retrieved online https://web.archive.org/web/20070110234016/ http:/www.goldsmithlf.com/Diamonds.html, 1 page.
Author Unknown, "Gemology 101," Mardon Jewelers: at the Mission Inn, Oct. 13, 2010, Retrieved online https://web.archive.org/web/20101013162932/https:/www.mardonjewelers.com/gemstones/gemology-101.php, 1 page.
Author Unknown, "PCGS: Reconsideration," Professional Coin Grading Service, Oct. 31, 2013, Retrieved online https://web.archive.org/web/20131031073907/https:/www.pcgs.com/reconsideration, 1 page.
Author Unknown, "Population Report, Professional Sports Authenticator," Feb. 10, 2013, Retrieved online https://web.archive.org/web/20130210162234/http:/www.psacard.com/POP/Default.aspx, 1 page.

(56) References Cited

OTHER PUBLICATIONS

Author Unknown, "Population Report, Professional Sports Authenticator," Feb. 18, 2013, Retrieved online https://web.archive.org/web/20130218141125/http:/www.psacard.com/pop/SubCategory.aspx?c=20003, 3 pages.

Author Unknown, "PSA Offers Easy Way to Sell Set Registry Cards Via Collectors Corner," Professional Sports Authenticator. Published on May 15, 2014. Retrieved online https://www.psacard.com/articles/articleview/8178/psa-offers-easy-way-sell-set-registry-cards-via-collectors-corner on Mar. 21, 2024, 2 pages.

Author Unknown, "What Is VVS Diamond Clarity and When Should You Choose It?" Jewelry Notes, Jan. 17, 2013, Retrieved online https://web.archive.org/web/20130117024849/https:/www.jewelrynotes.com/what-is-vvs-diamond-clarity-and-when-should-you-choose-it/, 5 pages.

\* cited by examiner

600

Receive a set of images of a group of collectables, each image from the set of images associated with at least one defect type label and at least one of a first grade classification label for surface conditions of a collectable from the group of collectables, a second grade classification label for edge conditions of the collectable, a third grade classification label for corner conditions of the collectable, or a fourth grade classification label for centering conditions of the collectable
602

Generate a set of preprocessed images based on the set of images by, for each image from the set of images, detecting a boundary defining the collectable in that image, performing a perspective warp transformation for that image from the set of images where the boundary for that image does not have a predetermined shape, and removing portions of that image not within the boundary defining the collectable
604

Train at least one model based on each preprocessed image from the set of preprocessed images, the at least one defect type label associated with that preprocessed image, and at least one of (1) the first grade classification label associated with that preprocessed image, (2) the second grade classification label associated with that preprocessed image, (3) the third grade classification label associated with that preprocessed image, or (4) the fourth grade classification label associated with that preprocessed image
606

Apply the at least one model to a new image of a new collectable not included in the group of collectables
608

Cause an output to be displayed indicating that the new collectable includes a defect, an approximate location of the defect, and a defect type associated with the defect
610

Preprocess an image of a collectable to generate a preprocessed image by detecting a boundary defining the collectable in the image, performing a perspective warp transformation to cause the boundary to have a predetermined shape, and removing portions of the image not within the boundary defining the collectable
702

Apply a machine learning (ML) model to the preprocessed image to generate a group of defect confidence levels, each defect confidence level from the group of defect confidence levels (1) associated with a unique portion of the preprocessed image from a group of unique portions of the preprocessed image, and (2) indicating a likelihood that at least one defect is present within that unique portion of the preprocessed image
704

Cause the preprocessed image to be displayed on a display
706

Cause each unique portion of the preprocessed image from the group of unique portions associated with a defect confidence level from the group of defect confidence levels outside a predetermined range to be indicated on the display
708

Augment a set of images of collectables to generate a set of synthetic images of collectables
802

Combine the set of images of collectables and the set of synthetic images of collectables to produce a training set
804

Train a set of machine learning models based on the training set, each machine learning model from the set of machine learning models configured to generate a grade for an image attribute from a set of image attributes, the set of image attributes including at least one of an edge, a corner, a center, or a surface
806

Execute, after training, the set of machine learning models to generate a set of grades for an image of a collectable not included in the training set
808

FIG. 8

METHODS AND APPARATUS FOR GRADING IMAGES OF COLLECTABLES USING IMAGE SEGMENTATION AND IMAGE ANALYSIS

CROSS-REFERENCE TO RELATED APPLICATIONS

This application claims priority to and the benefit of U.S. Provisional Patent Application No. 63/150,793, filed Feb. 18, 2021 and titled "METHODS AND APPARATUS FOR GRADING IMAGES OF COLLECTABLES USING MACHINE LEARNING MODELS", the contents of which are incorporated by reference in its entirety herein".

TECHNICAL FIELD

The present disclosure relates to image analysis of images representative of "real" things, and in particular to apparatus and methods for performing image analysis on one or more segments of images to grade images of collectables.

BACKGROUND

Grading images of collectables can be useful to, for example, assess the value of assets. Grading images of collectables can include, for example, grading different segments of the images, such as segments representing corners or edges of a collectable. Known methods of appraisal, however, can be labor-intensive and costly. Thus, a need exists for apparatus and methods to accurately and efficiently grade collectables.

SUMMARY

In some embodiments, a method can include receiving a set of images of a group of collectables. Each image from the set of images is associated with at least one defect type label and at least one of a first grade classification label for surface conditions of a collectable from the group of collectables, a second grade classification label for edge conditions of the collectable, a third grade classification label for corner conditions of the collectable, or a fourth grade classification label for centering conditions of the collectable. The method can further include generating a set of preprocessed images based on the set of images by, for each image from the set of images, detecting a boundary defining the collectable in that image, performing a perspective warp transformation for that image from the set of images where the boundary for that image does not have a predetermined shape, and removing portions of that image not within the boundary defining the collectable. The method can further include training at least one model based on each preprocessed image from the set of preprocessed images, the at least one defect type label associated with that preprocessed image, and at least one of (1) the first grade classification label associated with that preprocessed image, (2) the second grade classification label associated with that preprocessed image, (3) the third grade classification label associated with that preprocessed image, or (4) the fourth grade classification label associated with that preprocessed image. The method can further include applying the at least one model to a new image of a new collectable not included in the group of collectables. The method can further include causing an output to be displayed indicating that the new collectable includes a defect, an approximate location of the defect, and a defect type associated with the defect.

In some embodiments, a non-transitory processor-readable medium stores code representing instructions to be executed by a processor. The instructions include code to cause the processor to preprocess an image of a collectable to generate a preprocessed image by detecting a boundary defining the collectable in the image, perform a perspective warp transformation to cause the boundary to have a predetermined shape, and remove portions of the image not within the boundary defining the collectable. The instructions can further include code to cause the processor to apply a machine learning (ML) model to the preprocessed image to generate a group of defect confidence levels. Each defect confidence level from the group of defect confidence levels is (1) associated with a unique portion of the preprocessed image from a group of unique portions of the preprocessed image, and (2) indicates a likelihood that at least one defect is present within that unique portion of the preprocessed image. The instructions can further include code to cause the processor to cause the preprocessed image to be displayed on a display. The instructions can further include code to cause the processor to cause each unique portion of the preprocessed image from the group of unique portions associated with a defect confidence level from the group of defect confidence levels outside a predetermined range to be indicated on the display.

In some embodiments, an apparatus includes a memory and a processor operatively coupled to the memory. The processor can be configured to augment a set of images of collectables to generate a set of synthetic images of collectables. The processor can further be configured to combine the set of images of collectables and the set of synthetic images of collectables to produce a training set. The processor can further be configured to train a set of machine learning models based on the training set. Each machine learning model from the set of machine learning models is configured to generate a grade for an image attribute from a set of image attributes. The set of image attributes includes at least one of an edge, a corner, a center, or a surface. The processor can be further configured to execute, after training, the set of machine learning models to generate a set of grades for an image of a collectable not included in the training set.

BRIEF DESCRIPTION OF THE DRAWINGS

FIG. 6 is a flowchart of a method for training and using a model(s) based on a set of preprocessed images, according to an embodiment.

FIG. 7 is a flowchart of a method for using a model to generate and use defect confidence levels, according to an embodiment.

FIG. 8 is a flowchart of a method for training a model using a training set including a set of synthetic images, according to an embodiment.

DETAILED DESCRIPTION

Non-limiting examples of various aspects and variations of the embodiments are described herein and illustrated in the accompanying drawings.

Methods and apparatus described herein can generate gradings of assets such as, for example, trading cards (e.g., sports cards, game cards, etc.), coins, currency, and/or the like.

Figure 1:
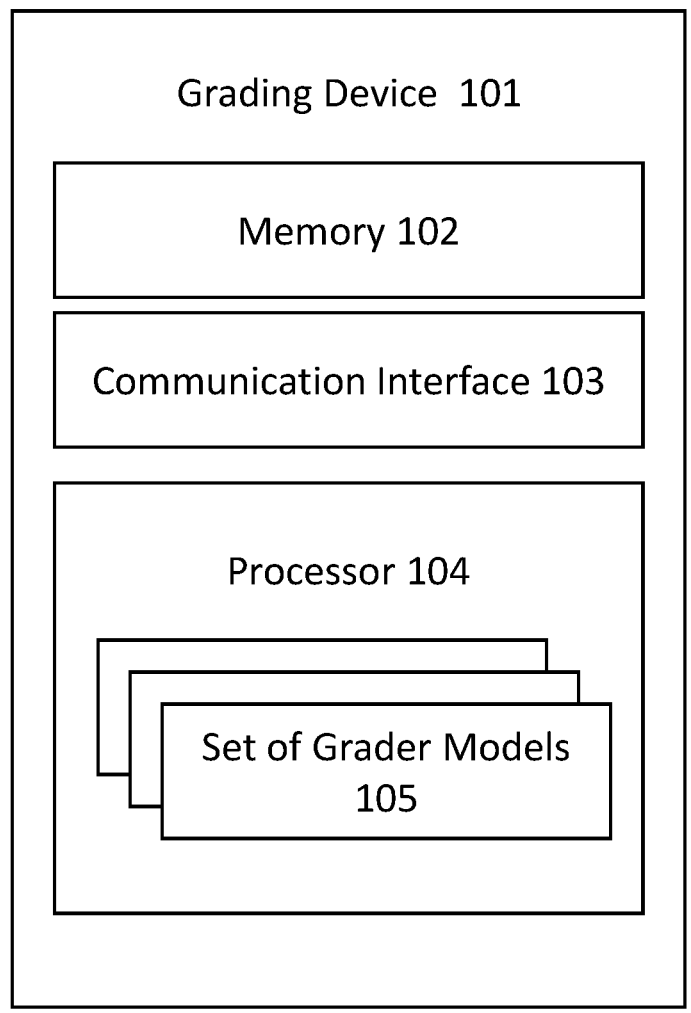
FIG. 1 is a schematic block diagram of a grading device, according to an embodiment.
Figure 2:
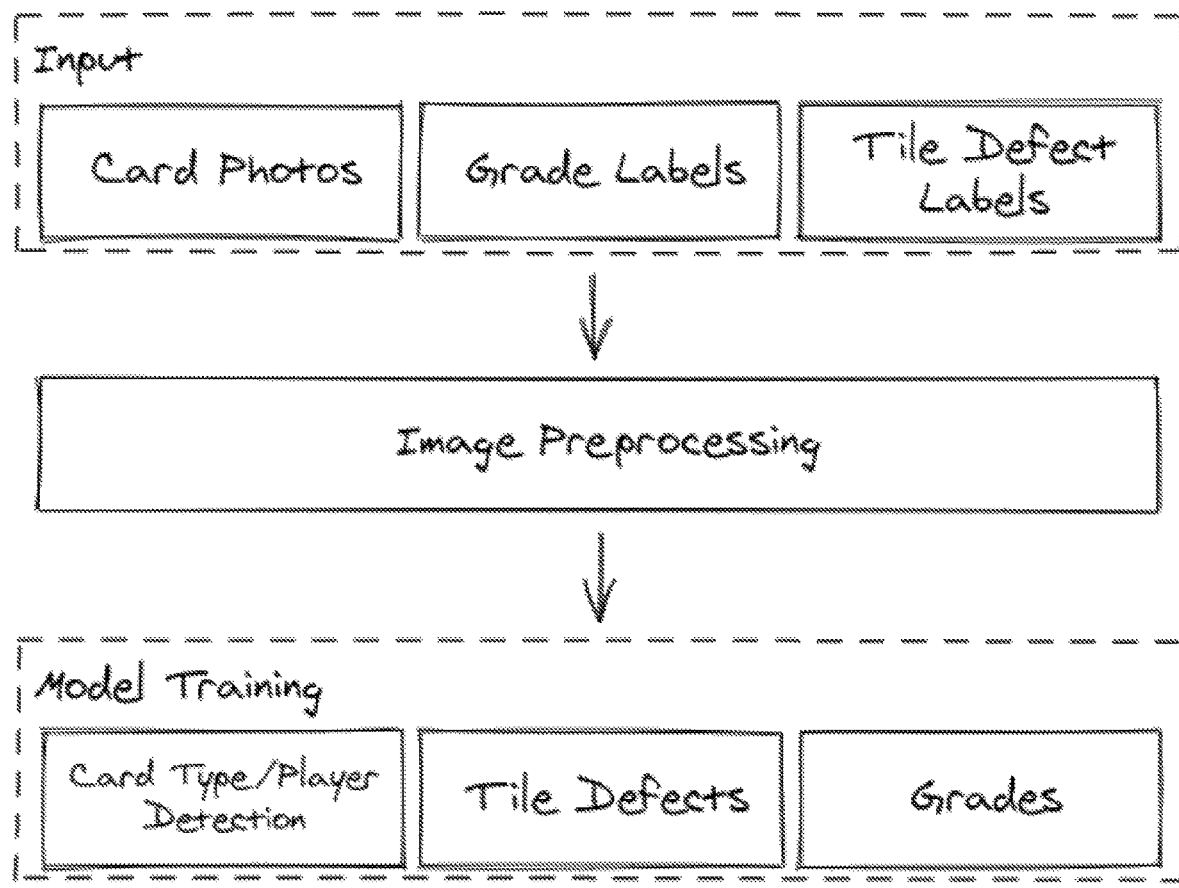
FIG. 2 is a flowchart of a method of training a grading device, according to an embodiment.

FIG. 1 is a schematic block diagram of a grading device 101, according to an embodiment. The grading device 101 (also referred to herein as 'appraisal device') can be or include a hardware-based computing device and/or a multimedia device, such as, for example, a computer, a desktop, a laptop, a smartphone, and/or the like. The grading device 101 includes a memory 102, a communication interface 103, and a processor 104. The grading device 101 can operate a set of grader models 105 that collectively can generate a grade for an image of a collectable (e.g., a trading card, a sports card, a collectable card, a coin, a currency, art, a stamp, an antique, a comic book, a toy, jewelry, etc.).

The memory 102 of the grading device 101 can be, for example, a memory buffer, a random-access memory (RAM), a read-only memory (ROM), a hard drive, a flash drive, and/or the like. The memory 102 can store, for example, a set of images of collectables (e.g., a set of images of trading cards, a set of images of collector cards, a set of images of coins, a set of images of stamps, a set of images of art, etc.), a set of grades (e.g., a set of numerical values), and/or code (e.g., programs written in C, C++, Python, etc.) that includes instructions to cause the processor 104 to perform one or more processes or functions (e.g., the set of grader models 105).

The communication interface 103 of the grading device 101 can be a hardware component of the grading device 101 to facilitate data communication between the grading device 101 and external devices (e.g., a network, a compute device, and/or a server; not shown). The communication interface 103 can be operatively coupled to and used by the processor 104 and/or the memory 102. The communication interface 103 can be, for example, a network interface card (NIC), a Wi-Fi® module, a Bluetooth® module, an optical communication module, and/or any other suitable wired and/or wireless communication interface.

The processor 104 can be, for example, a hardware based integrated circuit (IC) or any other suitable processing device configured to run or execute a set of instructions or a set of codes. For example, the processor 104 can include a general-purpose processor, a central processing unit (CPU), an application specific integrated circuit (ASIC), a graphics processing unit (GPU), and/or the like. The processor 104 is operatively coupled to the memory 102 through a system bus (for example, address bus, data bus, and/or control bus; not shown). The processor 104 includes a set of grader models 105. Each grader model from the set of grader models 105 can be configured to grade an attribute or part of an image of a collectable from the set of images of collectables and can include software stored in the memory 102 and executed by the processor 104. In some instances, a grader model from the set of grader models 105 can include a collectable and/or card type predictor (not shown) and/or a tile defect predictor (not shown). Each of the collectable and/or card type predictor or the tile defect predictor can include software stored in the memory 102 and executed by the processor 104.

Generating Trained Models

Figure 4:
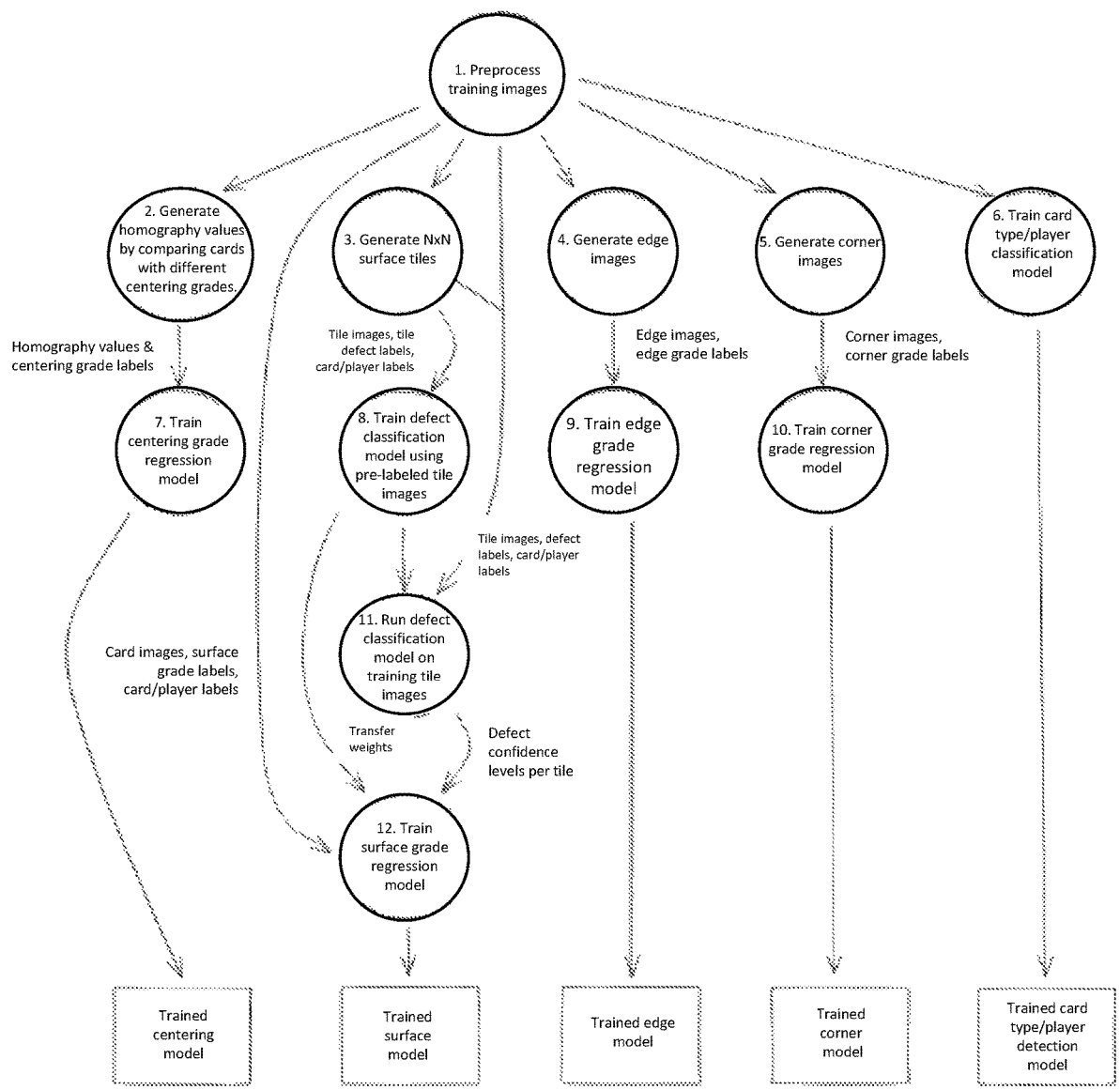
FIG. 4 is a flowchart of a method of training a grading device, according to an embodiment.

FIG. 4 shows is a flowchart of a method of training a grading device(s) (e.g., grading device 101), according to an embodiment. In some implementations, the method discussed with respect to FIG. 4 can be performed by a processor (e.g., processor 104 of FIG. 1). At step 1, training images are preprocessed. Preprocessing can cause the training images and/or portions of the training images (e.g., image of just the collectable) to have a standardized format in at least one aspect. Preprocessing can include, for example, cutting, cropping, filtering, reshaping, and/or resizing the training images and/or portions thereof. The training images and/or preprocessed training images can be associated with one or more labels and/or grades, such as a centering grade, tile defect label, collectable and/or card type label, player information, character information, edge grade, corner grade, and/or the like. Moreover, as discussed in further detail herein, in some instances, synthetic images can be generated for training.

At step 2, homography values are generated by comparing collectables (e.g., cards, stamps, art, etc.) with different centering grades. A centering grade regression model (e.g., neural network) can be trained at step 7 using the homography values, the centering grade labels, and/or the preprocessed training images to generate a trained centering model. In some implementations, the homography values and/or preprocessed images can be used as input learning data for the centering grade regression model, and the centering grade labels can be used as target learning data for the centering grade regression model.

At step 3, N×N surface tiles are generated for each of the preprocessed training images. A defect classification model can be trained at step 8 using the surfaces tiles, defect labels that may be associated with the surface tiles, collectable and/or card type label, player information, and/or character information to identify defects (e.g., generate defect confidence levels for surface tiles). The trained defect classification model can then be run at step 11 using the surface tiles, defect labels, collectable and/or card type, player information, and/or character information to generate defect confidence levels for each surface tile. At step 12, the preprocessed training images, transferred weights from the defect classification model trained at step 8, and defect confidence levels generated at step 11 can be used to train a surface grade regression model.

At step 4, edge images are generated using the preprocessed training images. The edge images and edge grade labels can be used at step 9 to train and generate an edge grade regression model. In some implementations, the edge images can be used as input learning data for the edge grade regression model, and the edge grade labels can be used as target learning data for the edge grade regression model.

At step 5, corner images are generated using the preprocessed training images. The corner images and corner grade labels can be used at step 10 to train and generate a corner grade regression model. In some implementations, the corner images can be used as input learning data for the corner grade regression model, and the corner grade labels can be used as target learning data for the corner grade regression model.

At step 6, a collectable and/or card type/player/character classification model can be trained and generated using the preprocessed training images (e.g., using computer vision). The collectable and/or card type/player/character classification model can be trained to identify a collectable type, card type (e.g., set, year, etc.), stamp type (e.g., year, issue, etc.), coin type, player information, character information, and/or any other information about the collectable. In some implementations, step 6 is performed prior to steps 8 and 11, and the trained collectable and/or card type/player/character classification model outputs the collectable type, card type, player information, stamp type (e.g., year, issue, etc.), coin type, character information and/or other information about the collectable, used at steps 8 and 11. In some implementations, steps 1-12 can be performed in any order. In some implementations, steps 1-12 can be performed in series, in parallel, or any combination thereof.

Image Preprocessing

The set of images of collectables (e.g., images of sport cards, game cards, collector cards, coins, stamps, art, etc.) used for training the set of grader models 105 and/or an image of a collectable (not among the set of images of collectables) used when executing the set of grader models 105 after training, can be taken using an imaging device (e.g., a camera, a scanner, etc. (not shown)) of the grading device or a device that is operatively coupled to the grading device 101. For example, the set of images of the collectables and/or the image of the collectable can be taken by a smartphone camera or a scanner. Therefore, images for processing by the processor 104 of the grading device 101 can be taken from slightly different angles, under different light conditions, and/or also contain an extra background surrounding the actual collectible (e.g., card). Therefore, image preprocessing can be used to generate preprocessed images based on images used to train the set of grader models 105 (e.g., the set of images of collectables) and/or images to be graded by the set of grader models 105 (e.g., to normalize images of collectables). In some instances, in order to use the images of collectables for training and/or grading purposes, one or more of the following preprocessing steps can be performed using any suitable technique (e.g., FIG. 4, Step 1):

1. Boundary detection of collectables in images of collectables.
2. Perspective warp transformation to convert images of collectables taken from imperfect angles into a rectangular shape.
3. Background removal by clipping the outer areas surrounding collectable boundaries in the images of collectables.
4. Resizing the images of collectables to a uniform size and resolution suitable for processing by machine learning models from the set of grader models 105.

In some implementations, a desirable shot of an image of a collectable can be selected from a live camera video feed and/or recording (e.g., from an image device) by applying the boundary detection algorithm in substantially real-time and selecting a frame with the detected boundaries closest to a rectangular shape. Doing so can minimize the extent of the perspective warp transformation, improve image quality and overall grading accuracy. Additionally or alternatively, a desirable shot of an image of a collectable can be selected from a live camera video and/or recording by applying resizing and/or resolution adjustment, and selecting a frame with a size and/or resolution closest to a desirable size and/or resolution. In some implementations, when multiple images exist (e.g., frames from a video and/or multiple still images) for a collectable, the selected, desirable shot can be used for generating a grade for the collectable.

In some implementations, for images of collectables with glossy surfaces, an additional preprocessing step can be performed to detect and skip the frames of a video including distracting reflections, saturation in the image, or white spots. An additional machine learning model can be trained to detect distracting reflections, saturation in image, or white spots, and filter out undesired frames, pixels, and/or the like from the images of collectables. In some implementations, a final image of a collectable can be produced by stitching unaffected parts of images of collectables collected or video frames. For example, if a first image of a collectable at a first frame includes reflections at the upper half of the first image, and a second image (different than the first image) of the collectable at a second frame (different than the first frame) includes reflections at the lower half of the second image, the lower half of the first image can be combined (e.g., stitched together) with the upper half of the second image to form a final image without distracting reflections (e.g., where the upper half does not overlap with the lower half, or where the upper half partially overlaps with the lower half).

Grading

In some instances, for example, a grading of an asset (e.g., a collectable such as a sports card) can include four scores (or grades), in a numerical range (e.g., on a scale from 1 to 10). The scores can represent a condition of the asset's surface, a condition of the asset's edges, a condition of the asset's corners, and/or a condition of the asset's centering. In some instances, a higher value for the score (or grade) can mean better a condition (e.g., for surface, edge, corners, or centering). Each side of the asset (or collectable) can be graded separately and can have its own set of grades. While four scores are illustrated in this example, in other implementations any number of scores for different aspects and/or attributes of the asset can be identified and used.

The grading of the asset can be accomplished by training an ensemble of machine learning models (e.g., artificial neural networks, convolutional neural networks, recurrent neural network, self-organizing maps, Boltzmann Machines, AutoEncoders, etc.) designed to handle specific types of grades (e.g., surface, edge, corners, centering, etc.). Each type of grade can have one or more designated machine learning models (e.g., a neural network model). In some implementations, grades (e.g., surface grades) can be identified using two machine learning models. In some implementations, each grade can be identified using any number of machine learning models.

In some implementations, a first machine learning model can be configured and/or trained to detect surface defect types on surface images of the set of images of collectables that are split into several smaller substantially equal sections (e.g., tiles). In some implementations, surface images of collectables are split into substantially equal sections, and one or more defect labels can be assigned (e.g., by a human, by a machine learning model, by a computer vision algorithm, etc.) to (1) each section (including those with or without defects), or (2) only sections that have defects. The defect label can be a letter, word, number, etc. indicating that a defect is present and/or the type of defect at a given section (e.g., wrinkled, creased, etc.). The defect label and the various equal sections can then be used to train the first machine learning model. For example, each section can be used as input learning data for a neural network, and the defect label(s) associated with that section can be used as output learning data for the neural network. A second machine learning model can perform a final grade regression by using the full surface image of a collectable along with the tile defect information from the first machine learning model for that collectable. The machine learning models can be trained using a training dataset that includes existing (e.g., thousands) images of collectables that can be pre-graded by professional human graders. For surface grades, for example, the training dataset can include grade labels assigned to each collectable photo as well as defect type labels assigned to individual tiles.

The input of the training process includes providing the set of images of collectables each associated with a first grade classification label (e.g., an integer values from 1 to 10) for surface, a second grade classification label (e.g., an integer values from 1 to 10) for edges, a third grade classification label (e.g., an integer values from 1 to 10) for corners, and/or a fourth grade classification label (e.g., an integer values from 1 to 10) for centering. The grade classification labels can be assigned to each photo, separately for the front and back side of each image from the set of images of collectables.

For surface grades, in addition to the grade labels, the training set can include classification labels for various defect types assigned to individual surface tiles of an image of a collectable that are outlined by an N×N grid of tiles. Each tile in the grid of tiles may have multiple types of defect labels such as, for example, creases, wrinkles, printing defects, stains, ink, etc. In some implementations, a set of surface flaw codes (e.g., represented as letters, numbers, etc.) can represent tile defect types. In some instances, the set of surface flaw codes can include, for example:

C—Crease, wrinkle, bend, fold, etc.
H—Hole, pinhole, punch, etc.
I—Impression, scratch, etc.
M—Miscut
P—Print, smear, registration, etc.
S—Stain
T—Tear, rip, broken surface, etc.
W—Writing, ink, etc.
Corner/Edge Flaw Codes
X—Corner (1-4)
E—Edge (1-N)
A—Wear (rounding and/or minor loss of stock or surface)
B—Crease or Lift (crease/bend or lift in surface of corner)
Y—Impact (impression, dent, or other indention that would not be noted with Surface Flaw Code)

In some implementations, an additional model can be trained to detect collectable and/or card type (e.g., set included in, year manufactured, manufacturer, etc.), player and/or character information, stamp type (e.g., year, issue, etc.), coin type (e.g., identification of the year, coin, etc.) and/or any other information regarding the collectable. This information can be used in the underlying grade models (e.g., the machine learning models described above) to reduce the number of false positives specific to particular collectable and/or card types. For example, some cards may contain wrinkles on a player's clothes that could be mistakenly identified as defects. Adding card type and/or player/character information (and/or other information specific to a collectable) to the grading models' input can help eliminate such false positives by training the model using the collectable-specific exceptions. The additional model can be, for example, a machine learning model, an artificial intelligence model, an analytical model, or a mathematical model. In some implementations, the additional model can be trained to detect collectable and/or card type, player information, character information, stamp type (e.g., year, issue, etc.), coin type (e.g., identification of the year, coin, etc.) and/or any other information regarding the collectable, using computer vision. In some implementations, the additional model can be trained using supervised learning. In some implementations, the additional model can be trained using unsupervised learning. In some implementations, the additional model is a neural network (e.g., convolutional neural network) trained using images of a collectable (e.g., card) as input learning data, and card type, player information, character information, and/or characteristics specific to that collectable as output learning data.

Figure 3:
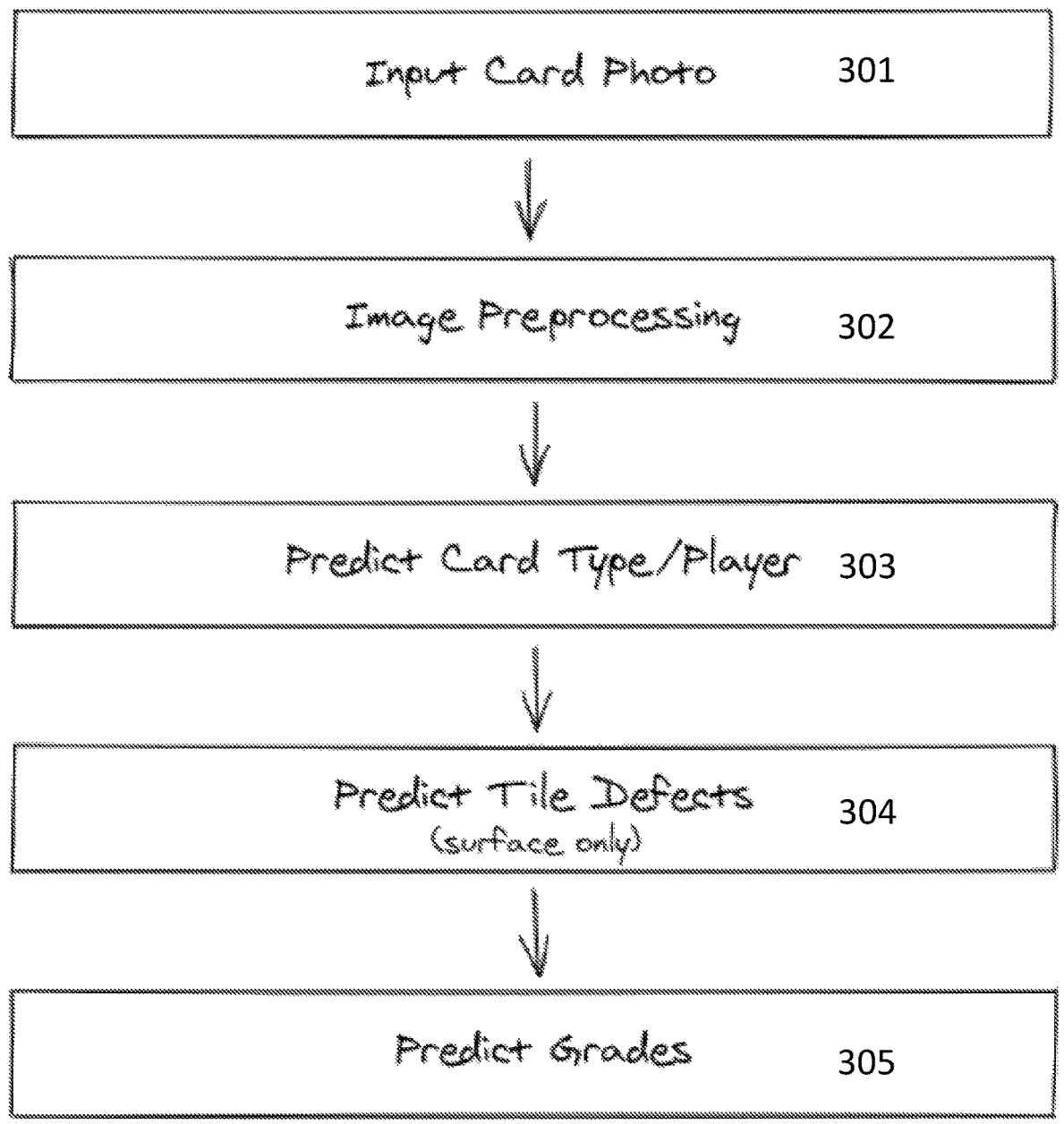
FIG. 3 is a flowchart of a method of using a grading device, according to an embodiment.

The resulting trained machine learning models can be used to perform grading on collectables (as shown in FIG. 3, at step 301). During the grading process, the same image preprocessing step (at step 302) as in the training phase can be applied to an input image of a collectable (e.g., a new collectable not associated with the training data) to generate a preprocessed image. The preprocessed image can then be input to the set of grader models 105 (e.g., including a trained surface grade regression model(s)) for predicting grades. The set of grader models 105 can predict a card type and/or a player/character information (at step 303) (or other information regarding the collectable). The set of grader models 105 can further predict tile defects (at step 304). The set of grader models 105 can further predict grades (at step 305) based on the information about the collectable (e.g., card type, the player/character information), the tile defects, and/or the other grades generated by the set of grader models 105. In some implementations, after the grades are calculated by the set of grader models 105, an additional overlay image can be constructed from the weights of a convolutional layer(s) of the grader model(s). The overlay image can be used to highlight specific areas of an image from the set of images of collectables (e.g., a card image) where defects are identified. Additionally or alternatively, the overlay image can be used to highlight specific areas of an image from the set of images of collectables where defects are not identified.

Grader for Surfaces

The set of grader models 105 can include a surface grader model. In some implementations, the surface grader model can be or include an ensemble of two separate models:

Tile defect classification model
Surface grade regression model

In some implementations, both the tile defect classification model and the surface grade regression model can be generated based on a pre-existing machine learning model (e.g., using transfer learning). For example, the machine learning model can be a pre-trained neural network model that is trained using a large dataset of generic images (e.g., the ImageNet data set (a publicly available dataset that include over 14 million images of real-world objects)). Using the pre-trained neural network model can add existing knowledge of various object shapes to the machine learning models and can make the set of grader models 105 (e.g., tile defect classification model and/or surface grad regression model) more effective in distinguishing between known object shapes and surface defects. In some implementations, for example, pre-trained ImageNet-based models such as VGGNet, ResNet, Inception, Xception, etc., can be used.

The tile defect classification model can be trained using a smaller subset of the training images classified by the surface flaw codes (as shown in FIG. 4, step 3 and step 8). After the tile defect classification model is trained, it can be used to classify the tiles in the training set and generate confidence levels for possible defects on each tile (as shown in FIG. 4, step 11).

Figure 5:
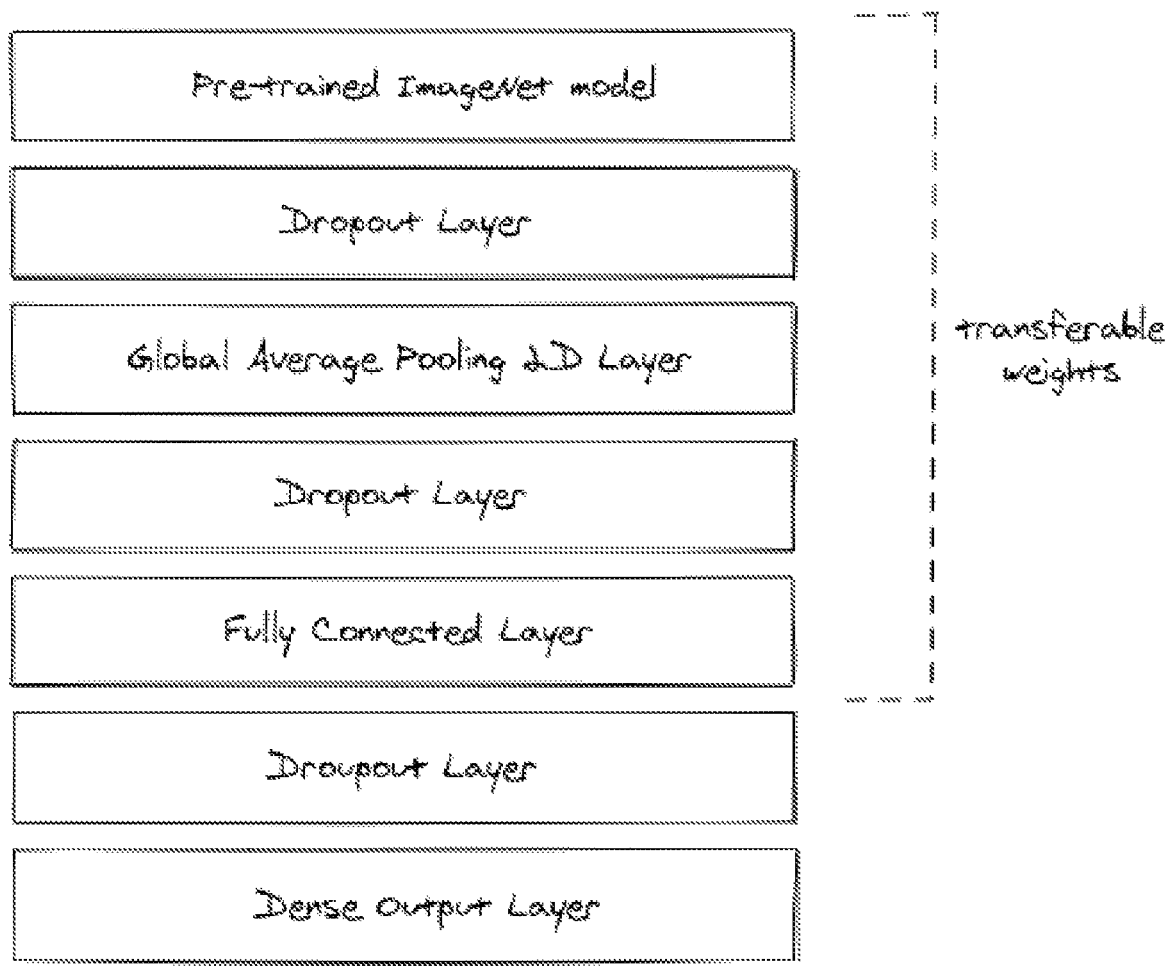
FIG. 5 is a schematic description of a machine learning model used for grading, according to an embodiment.

A structure of layers in a tile defect classification model (e.g., neural network) is shown in FIG. 5, according to an embodiment. Additional layers that are responsible for classifying tile defects in images of collectables can be added to the base model (e.g., trained with the generic images). Dropout layers can be used to reduce model overfitting and provide a better generalization for the neural network. In some implementations, a size of the final output layer can be determined by a number of supported defect types. For example, in an application of the grading device 101 for a specific type of collectables there can be N (e.g., seven, ten, one-hundred, etc.) types of defects that can happen to the specific type of collectables. Therefore, the size of the final output layer of the tile defect classification model can be N (e.g., N integers). For example, the output of the tile defect classification model can include N confidence levels, in the range from 0.0 to 1.0, where N is the number of supported defect types.

A structure of layers in the surface grade regression model can be similar to the structure of layers in the tile defect classification model. A difference between the layer structures can be a size of the last output layer of the surface grade regression model. Since the surface grade regression model is a regression model, in some implementations the surface grade regression model has one output that represents a continuous value of the surface grade. Similarly stated, in such implementations a grade can be represented as a decimal numeral (e.g., 5.0, 8.5, 9.99) as opposed to the tile defect classification model where the output is a label.

In addition, weights from the tile defect classification model (FIG. 5) can be transferred into the surface grade regression model, making the surface grade regression model capable of recognizing defect patterns learned by the tile defect classification model (FIG. 4, step 8 and step 12).

Grader for Edges and Corners

The set of grader models 105 can include specialized models for edges and corners. In some implementations, the specialized models for edges and corners can have the same and/or similar layer structure. In some instances, the specialized models for edges and corners can be similar to the tile defect classification model with a difference in a number of outputs in the final layer (output layer). In some implementations, the specialized models for edges and corners have one output, representing a continuous grade value (e.g., a value between 0-10). The grade can represent a condition of the edge and/or corner, and be used to determine if a remedial action should be performed. If, for example, the grade is outside a predetermined acceptable range, that edge and/or corner can be indicated as defective.

In some implementations, separate input images for an edge grader model and a corner grader model can be extracted from the preprocessed images. Similar to the tile defect classification model and the surface grade regression model, the edge grader model and/or the corner grader model each can provide a capability of generating an overlay image to highlight defects in edges and/or corners.

Grader for Centering

The set of grader models 105 can include specialized models for center of images of collectables for determining how centered the collectable is. In some implementations, where the collectable includes an image (e.g., of a player or character) printed on a card stock, a centering grade can refer to how center the image is on the card stock. In some implementations, grades for center of images of collectables can be calculated by a center regression grader model that takes a set of homography matrices as an input. The set of homography matrices can be computed by comparing the preprocessed images in a training set with a number of other collectables (e.g., cards) that have different centering grades (as shown in FIG. 4, step 2). Such an approach can resemble triangulation where homography distances between different centering grades are taken into account (e.g., using computer vision). The grade can represent a condition of the centering for an image of a collectable(s), and be used to determine if a remedial action should be performed. If, for example, the grade is outside a predetermined acceptable range, the centering of the image of the collectable can be indicated as defective (e.g., via text or any other label indicating that the centering condition is not desirable).

In some instances, besides the homography values, the center regression grader model can take the collectable specific information (e.g., card type and/or player/character information) as an input. Doing so can ensure that a collectable and/or card type specific bias is avoided.

Handling Imbalanced Training Data

In some instances, a challenging part of making the set of grading models accurate is the problem of overfitting the training set when using a limited, imbalanced training data set. The grading device 101 of FIG. 1 can train accurate prediction models with a training set that does not cover large numbers of samples for each collectable-specific information (e.g., card type, player/character, and grade combination). In other words, the set of grader models 105 of the grading device 101 are developed to generalize generation of grades based on images of collectables. As such, the same set of grader models trained based on the training set can successfully grade a wide range of collectable images (e.g., a wide range of sports cards and/or player sets, a wide ranges of stamps, a wide range of art, etc.) based on a reusable number of images in the training set (e.g., thousands of images) without maintaining an extremely large training set (e.g., billions of images).

In some implementations, a method of generalization to avoid or reduce some of problems with an imbalanced training data can involve, for example, one or more of:
1. Training set upsampling and downsampling. The purpose of this step is to adjust the training set, such that the training set has a relatively equal distribution of a number of samples across all grades. For grades that have greater than the average number of samples, the data set can be reduced by randomly dropping excess samples from the data set (downsampling). For the grades with the number of samples less than the average, additional synthetic images of collectables can be generated and added to the training set (upsampling).
2. Dropout layers. The use of Dropout layers enables a very computationally cheap and effective regularization method to reduce overfitting and improve generalization error for the grading models.
3. Layer weight regularizers. Similar to Dropout layers, weight regularizers reduce the possibility of a machine learning model (e.g., a neural network) overfitting by constraining the range of the weight values within the network. In some instances, weight regularizers can be added to individual layers of the network including the layers in the base model trained on generic image data.
4. K-fold validation can be used to improve generalization and reduce overfitting.
5. Additional image augmentation by generating synthetic training data.

In some instances, a number of Dropout layers, Dropout rates, and/or a number of weight regularizers can be determined during a hyperparameter optimization phase. The hyperparameter optimization phase can improve, tune, and/or optimize hyperparameters of a model (e.g., a model from the set of grader models 105 from FIG. 1). Additional details regarding hyperparameter optimization are discussed below.

Synthetic Training Images

In some implementations, the grading device 101 can generate synthetic images (in addition to the set of images of collectables) to further improve an accuracy of the set of grader models 105 trained on a moderate data set. In some instances, a set of image augmentation techniques can be randomly applied to the set of images of collectables to extend the training set with additional synthetic images. The set of image augmentation techniques can include, for one or more images from the set of images of the collectable, a rotation, a vertical and/or horizontal shift, a scaling, a brightness and contrast adjustment, a vertical and/or horizontal flip, and/or the like to generate a set of synthetic images. The set of synthetic images, in addition to the set of images of the collectable, can be used for training or retraining one or more grader models from set of grader models 105. In some implementations, the set of synthetic images are preprocessed (e.g., perspective warp transformation, resize, crop background, etc.) before being used to train to one or more grader models from the set of grader models 105.

The set of augmentation techniques can ensure consistent grading accuracy for images of collectables taken using cameras with different capabilities (e.g., resolution, zoom, filters, depth, etc.) and/or taken under different light conditions (e.g., angles). Using augmentation can also significantly extend a number of samples in the training set and can improve generalization of the set of grader models 105.

Hyperparameter Tuning

Hyperparameters of the set of grader models 105 can optimized using one of the following tuning algorithms: a random search, a hyperband, a Bayesian optimization, and/or the like. An effectiveness of a specific tuning algorithm may differ based on training set and other factors. Therefore, the tuning algorithms can be evaluated individually to achieve best accuracy for specific models and specific training sets.

Tunable parameters and/or hyperparameters for the set of grader models 105 can include, for example:
1. Neural Network Parameters
    Layer sizes
    Number of Dropout layers
    Dropout rates
    Weight regularizer types
    Regularization factors
    Type of ImageNet-based model
2. Image Augmentation Parameters
    Ranges for rotation angle, shift, brightness, scaling, and flip.
3. Training Parameters
    Optimizer type
    Learning rate
    Batch size
    Number of epochs Defect Visualization Defects identified by the set of grader models 105 can be visualized as an overlay of the original collectable image. The overlay can be constructed from the weights of the last convolutional layer of a model trained using generic image data. For example, if the model trained using generic image data is a VGGNet (Visual Geometry Group Network) model, the last convolutional layer would be block5_conv3. Greater weight values represent higher confidence of a defect being detected at the corresponding pixel or a group of pixels.

Ranges of weight values can be represented using different overlay colors or pixel intensity, effectively creating a heatmap representation. Other visual cues can be achieved by displaying contours or highlighting areas around the clusters of high-intensity with weight values greater than a certain threshold. Such visual depictions can be presented and/or displayed to a user via a user device (e.g., the grading device 101 and/or a device operatively coupled to the grading device).

In some implementations, the grading device 101 can be operatively coupled to a compute device (not shown) and/or a server (not shown) via a network to transmit and/or receive data (e.g., images of collectables) and/or analytical models via the network. In some instances, the compute device and/or the server can provide training data to the grading device 101. In some instances, the compute device and/or the server can execute a trained machine learning model(s) to perform grading of assets, such as for example, collectables.

FIG. 6 is a flowchart of a method 600 for training and using a model(s) based on a set of preprocessed images, according to an embodiment. In some implementations, the method 600 can be performed by a processor (e.g., processor 104 of FIG. 1). For example, instructions to cause the processor 104 to execute the method 600 can be stored in memory 102 of FIG. 1.

At 602, a set of images of a group of collectables (e.g., one collectable, two collectables, three collectables, etc.) is received. Each image from the set of images is associated with at least one defect type label and at least one of a first grade classification label for surface conditions of a collectable from the group of collectables, a second grade classification label for edge conditions of the collectable, a third grade classification label for corner conditions of the collectable, or a fourth grade classification label for centering conditions of the collectable. In some implementations, the group of collectables can include only trading cards, only coins, only currency, only art, only stamps, only antiques, only comic books, only toys, only jewelry, or a combination thereof. In some implementations, the set of images are of a common side (e.g., the front) of the group of collectables. In some implementations, the set of images are of various different sides (e.g., the front and the back) of the group of collectables. In some implementations, a collectable refers to an item of interest to a collector. In some implementations, a collectable refers to something that can be collected.

At 604, a set of preprocessed images are generated based on the set of images by, for each image from the set of images, detecting a boundary defining the collectable in that image, performing a perspective warp transformation for that image from the set of images where the boundary for the that image does not have a predetermined shape (e.g., square, rectangle, parallelogram, etc.), and removing portions of that image not within the boundary defining the collectable. In some implementations, step 604 is performed automatically (e.g., without requiring human input) in response to receiving the set of images. In some implementations, the generating the set of preprocessed images further includes resizing each image from the set of images having a size that is not a predetermined size to cause that image to have the predetermined size. In some implementations, the generating the set of preprocessed images further includes resizing each image from the set of images having a resolution that is not within a predetermined resolution range to cause that image to have the resolution within the predetermined resolution range.

At 606, at least one model (e.g., the set of grader models 105 shown in FIG. 1) is trained based on each preprocessed image from the set of preprocessed images, the at least one defect type label associated with that preprocessed image, and at least one of (1) the first grade classification label associated with that preprocessed image, (2) the second grade classification label associated with that preprocessed image, (3) the third grade classification label associated with that preprocessed image, or (4) the fourth grade classification label associated with that preprocessed image. In some implementations, the at least one model includes at least one dropout layer to reduce overfitting. In some implementations, the at least one model includes (1) a first model trained using (a) each preprocessed image from the set of preprocessed images, and (b) the first grade classification label associated with that preprocessed image, (2) a second model trained using (a) each preprocessed image from the set of preprocessed images, and (b) the second grade classification label associated with that preprocessed image, (3) a third model trained using (a) each preprocessed image from the set of preprocessed images, and (b) the third grade classification label associated with that preprocessed image, (4) a fourth model trained using (a) each preprocessed image from the set of preprocessed images, and (b) the fourth grade classification label associated with that preprocessed image, and (5) a fifth model trained using (a) each preprocessed image from the set of preprocessed images, and (b) the at least one defect type label associated with that preprocessed image.

At 608, the at least one model is applied to a new image of a new collectable not included in the group of collectables. In some implementations, the at least one model is applied to the new image automatically in response to a representation of the new image being received (e.g., by processor 104 of FIG. 1).

At 610, an output is caused to be displayed indicating that the new collectable includes a defect, an approximate location of the defect, and a defect type associated with the defect. In some implementations, 610 is performed automatically (e.g., without requiring human input) in response to applying the at least one model to the new image at 608. In some implementations, the output is caused to be displayed by a processor (e.g., processor 104) sending at least one electronic signal to a display (not shown in FIG. 1), operatively coupled to the processor via a wired and/or wireless connection, to cause the display to indicate that the new collectable includes the defect (e.g., via text, symbol, color code, highlighting, etc.), the approximate location of the defect (e.g., via text, symbol, color code, highlighting, etc.), and the defect type (e.g., bend, crease, etc.) associated with the defect (e.g., via text, symbol, color code, highlighting, etc.).

In some implementations of method 600, a first image from the set of images is captured or taken under a first lighting conditions, and a second image from the set of images is captured or taken under a second lighting condition different than the first lighting condition. The lighting condition can be, for example, an amount of brightness.

In some implementations of method 600, a first image from the set of images is captured or taken at a first angle relative to a first collectable from the group of collectables, and a second image from the set of images is taken at a second angle relative to one of the first collectable or a second collectable from the group of collectables different than the first collectable. The second angle is different than the first angle. The first image and the second image can be captured or taken using the same imaging device (e.g., a single common camera), or different image devices (e.g., two different cameras).

In some implementations of method 600, a first image from the set of images was taken with a first background, and a second image from the set of images was taken with a second background different than the first background. For example, the first background and the second background may be of a different color, texture, pattern, shape, orientation, scenery, etc.

In some implementations, method 600 further includes optimizing and/or improving hyperparameters associated with the at least one model using at least one of a random search algorithm, a hyperband algorithm, or a Bayesian optimization algorithm.

FIG. 7 is a flowchart of a method 700 for using a model to generate and use defect confidence levels, according to an embodiment. In some implementations, the method 700 can be performed by a processor (e.g., processor 104 of FIG. 1). For example, instructions to cause the processor 104 to execute the method 700 can be stored in memory 102 of FIG. 1.

At 702, an image of a collectable is preprocessed to generate a preprocessed image by detecting a boundary defining the collectable in the image, performing a perspective warp transformation to cause the boundary to have a predetermined shape (e.g., rectangle, square, parallelogram, etc.), and removing portions of the image not within the boundary defining the collectable. The collectable can be, for example, a trading card (e.g., baseball card, basketball card, football card, Pokemon® card, etc.), coin, currency, art, stamp, antique, comic book, toy, jewelry, etc. The image can be collected by an imaging device, such as a camera or scanner.

At 704, a machine learning (ML) model (e.g., the set of grader models 105 of FIG. 1) is applied to the preprocessed image to generate a group of defect confidence levels. Each defect confidence level from the group of defect confidence levels (1) is associated with a unique portion of the preprocessed image from a group of unique portions of the preprocessed image, and (2) indicates a likelihood that at least one defect is present within that unique portion of the preprocessed image. In some implementations, 704 is performed automatically (e.g., without requiring human input) in response to generating the preprocessed image at 702. In some implementations, each of the defect confidence level is associated with a number value (e.g., between 0-100, between 0%-100%, between 1-10, etc.). In some implementations, each of the defect confidence levels is associated with a text label (e.g., pristine, mint condition, near mint, excellent, very good, good, poor, etc.). In some implementations, each unique portion from the group of unique portions does not overlap with any other unique portion from the group of unique portions (e.g., one unique portion for a top half and another unique portion for a bottom half). In some implementations, at least one unique portion from the group of unique portions (e.g., one to all unique portions from the group of unique portions) overlaps with another unique portion from the group of unique portions (e.g., a first unique portion for a top half, a second unique portion for a bottom half, and a third unique portion for a center portion including subsections of the top half and the bottom half).

At 706, the preprocessed image is caused to be displayed on a display. In some implementations, 706 is performed automatically (e.g., without requiring human input) in response to generating the group of confidence levels at 704. In some implementations, the output is caused to be displayed on a display by a processor (e.g., processor 104) sending at least one electronic signal to a display (not shown in FIG. 1), operatively coupled to the processor via a wired and/or wireless connection, to cause the display to display the preprocessed image.

At 708, each unique portion of the preprocessed image from the group of unique portions associated with a defect confidence level from the group of defect confidence levels outside a predetermined range is caused to be indicated on the display. In some implementations, 708 is performed automatically (e.g., without requiring human input) in response to the preprocessed image being caused to be displayed at 706. In some implementations, a defect confidence level being within the predetermined range indicates that the unique portion associated with that defect confidence level is in a desirable (or "good enough") condition (e.g., pristine, mint, excellent, etc.), and a defect confidence level being outside the predetermined range indicates that the unique portion associated with that defect confidence level is not a desirable condition (e.g., not good, poor, etc.). In some implementations, the predetermined range can be adjusted (e.g., via instructions input by a user and received at the processor) for a particular use case (i.e., based on what would be considered an acceptable condition by a user, customer, organization, order, etc.).

In some implementations, the ML model is a first ML model, and method 700 further includes applying a second ML model to the preprocessed image to generate a first score indicating surface conditions of the collectable, applying a third ML model to the preprocessed image to generate a second score indicating edge conditions of the collectable, applying a fourth ML model to the preprocessed image to generate a third score indicating corner conditions of the collectable, and applying a fifth ML model to the preprocessed image to generate a fourth score indicating centering conditions of the collectable. Method 700 can further include assigning at least one label indicating an overall condition of the collectable to the collectable based on the first score, the second score, the third score, and the fourth score. In some implementations, the at least one label can indicate that the overall condition is one of: pristine, mint, near mint/mint, near mint, excellent/near mint, excellent, very good/excellent, very good, good, or poor. In some implementations, a number value that is a function of (e.g., sum, average, weighted average, etc.) the first score, the second score, the third score, and/or the fourth score corresponds to (e.g., is within a number range associated with) the at least one label; thus, the number value can be calculated and used to determine the at least one label. Method 700 can further include displaying each defect confidence level from the group of defect confidence levels as superimposed on a unique portion of the preprocessed image associated that defect confidence level. For example, if the preprocessed image included N unique portions (e.g., tiles), N defect confidence levels can be displayed, where each confidence level is associated with (e.g., superimposed on) a different unique portion.

In some implementations, method 700 can further include applying a computer vision model to the preprocessed image to identify at least one of a card type, player information, character information, and/or other information associated with the collectable, where at least one of the card type, the player information, the character information, and/or the other information is used by at least one of the first ML model to generate the group of defect confidence levels, the second ML model to generate the first score, the third ML model to generate the second score, the fourth ML model to generate the third score, or the fifth ML model to generate the fourth score. In some implementations, the applying of the first ML model is performed prior to the applying of the $2^{nd}$-$5^{th}$ ML model, and at least two of the applying of the second ML model, the applying of the third ML model, the applying of the fourth ML model, or the applying of the fifth ML model are performed in parallel. In some implementations, the $1^{st}$-$5^{th}$ ML models can be applied in series, in parallel, or any combination thereof.

In some implementations, the preprocessing at 702 further includes resizing the image to a predetermined size. In some implementations, the preprocessing at 702 further includes resizing the image to cause the image to have a resolution within a predetermined resolution range.

In some implementations, method 700 further includes determining, for the preprocessed image, at least one of a card type, player information, character information and/or other information associated with the collectable. The ML model can be further applied to at least one of the card type, the player information, the character information and/or other information associated with the collectable to generate the group of defect confidence levels. Said similarly, the group of defect confidence levels can be generated by the ML model based, at least partially, on the at least one of the card type, the player information, the character information and/or other information associated with the collectable.

FIG. 8 is a flowchart of a method 800 for training a model using a training set including a set of synthetic images, according to an embodiment. In some implementations, the method 700 can be performed by a processor (e.g., processor 104 of FIG. 1). For example, instructions to cause the processor 104 to execute the method 700 can be stored in memory 102 of FIG. 1.

At 802, a set of images of collectables (e.g., only trading cards, only coins, only currency, a combination of cards, coins, and/or currency, etc.) is augmented to generate a set of synthetic images of collectables. In some implementations, augmenting at 802 can include at least one of rotating a first image from the set of images, shifting the first image vertically, shifting the first image horizontally, scaling the first image, adjusting a brightness of the first image, adjusting a contrast of the first image, flipping the first image vertically, or flipping the first image horizontally. At 804, the set of images of collectables and the set of synthetic images of collectables are combined to produce a training set. At 806, a set of machine learning models (e.g., set of grader models 105 of FIG. 1) are trained based on the training set. Each machine learning model from the set of machine learning models is configured to generate a grade for an image attribute from a set of image attributes. The set of image attributes includes at least one of an edge, a corner, a center, or a surface. At 808, the set of machine learning models are executed, after training, to generate a set of grades for an image of a collectable not included in the training set. In some implementations, the set of grades can be used to determine that the collectable not included in the training set is defective, and a signal can be sent to cause at least one remedial action to occur (e.g., flagging the image, flagging the collectable, notifying a user, etc.). In some implementations, at least one image from the set of images is captured using at least one first camera setting, and the image of the collectable not included in the training set is captured using a second camera setting different than the at least one first camera setting It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In order to address various issues and advance the art, the entirety of this application (including the Cover Page, Title, Headings, Background, Summary, Brief Description of the Drawings, Detailed Description, Claims, Abstract, Figures, Appendices, and otherwise) shows, by way of illustration, various embodiments in which the claimed innovations can be practiced. The advantages and features of the application are of a representative sample of embodiments only and are not exhaustive and/or exclusive. They are presented to assist in understanding and teach the claimed principles.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the embodiments, shall have its ordinary meaning as used in the field of patent law.

What is claimed is:

1. A method, comprising:
receiving a set of images of a plurality of collectables, each image from the set of images associated with at least one defect type label, a first grade classification label for surface conditions of a collectable from the plurality of collectables, a second grade classification label for edge conditions of the collectable, and a third grade classification label for corner conditions of the collectable;
generating a set of preprocessed images based on the set of images by, for each image from the set of images, detecting a boundary defining the collectable in that image, performing a perspective warp transformation for that image from the set of images where the boundary for that image does not have a predetermined shape, and removing portions of that image not within the boundary defining the collectable;
training at least one model based on each preprocessed image from the set of preprocessed images, the at least one defect type label associated with that preprocessed image, and at least one of (1) the first grade classification label associated with that preprocessed image, (2) the second grade classification label associated with that preprocessed image, or (3) the third grade classification label associated with that preprocessed image, the at least one model including (1) a first model trained using (a) each preprocessed image from the set of preprocessed images, and (b) the first grade classification label associated with that preprocessed image, (2) a second model trained using (a) each preprocessed image from the set of preprocessed images, and (b) the second grade classification label associated with that preprocessed image, and (3) a third model trained using (a) each preprocessed image from the set of preprocessed images, and (b) the third grade classification label associated with that preprocessed image;

applying the at least one model to a new image of a new collectable not included in the plurality of collectables; and causing an output to be displayed indicating that the new collectable includes a defect, an approximate location of the defect, and a defect type associated with the defect.

2. The method of claim 1, wherein a first image from the set of images was taken under a first lighting condition, and a second image from the set of images was taken under a second lighting condition different than the first lighting condition.

3. The method of claim 1, wherein a first image from the set of images was taken at a first angle relative to a first collectable from the plurality of collectables, and a second image from the set of images was taken at a second angle relative to one of the first collectable or a second collectable from the plurality of collectables different than the first collectable, the second angle different than the first angle.

4. The method of claim 1, wherein a first image from the set of images was taken with a first background, and a second image from the set of images was taken with a second background different than the first background.

5. The method of claim 1, wherein the generating the set of preprocessed images further includes resizing each image from the set of images having a size that is not a predetermined size to cause that image to have the predetermined size.

6. The method of claim 1, wherein the generating the set of preprocessed images further includes resizing each image from the set of images having a resolution that is not within a predetermined resolution range to cause that image to have the resolution within the predetermined resolution range.

7. The method of claim 1, wherein the at least one model includes at least one dropout layer to reduce overfitting.

8. The method of claim 1, further comprising
improving hyperparameters associated with the at least one model using at least one of a random search algorithm, a hyperband algorithm, or a Bayesian optimization algorithm.

9. The method of claim 1, wherein each image from the set of images is further associated with a fourth grade classification label for centering conditions of the collectable and the at least one model further includes (1) a fourth model trained using (a) each preprocessed image from the set of preprocessed images, and (b) the fourth grade classification label associated with that preprocessed image and (2) a fifth model trained using (a) each preprocessed image from the set of preprocessed images, and (b) the at least one defect type label associated with that preprocessed image.

10. A non-transitory processor-readable medium storing code representing instructions to be executed by a processor, the instructions comprising code to cause the processor to:
preprocess an image of a collectable to generate a preprocessed image by detecting a boundary defining the collectable in the image, performing a perspective warp transformation to cause the boundary to have a predetermined shape, and removing portions of the image not within the boundary defining the collectable;

apply a machine learning (ML) model to the preprocessed image to generate a plurality of defect confidence levels, each defect confidence level from the plurality of defect confidence levels (1) associated with a unique portion of the preprocessed image from a plurality of unique portions of the preprocessed image, and (2) indicating a likelihood that at least one defect is present within that unique portion of the preprocessed image, the ML model trained using a training dataset that includes at least one image and at least one synthetic image generated by modifying a brightness of the at least one image;

cause the preprocessed image to be displayed on a display; and cause each unique portion of the preprocessed image from the plurality of unique portions associated with a defect confidence level from the plurality of defect confidence levels outside a predetermined range to be indicated on the display.

11. The non-transitory processor-readable medium of claim 10, wherein the ML model is a first ML model, and the code further comprises code to cause the processor to:
apply a second ML model to the preprocessed image to generate a first score indicating surface conditions of the collectable;

apply a third ML model to the preprocessed image to generate a second score indicating edge conditions of the collectable;

apply a fourth ML model to the preprocessed image to generate a third score indicating corner conditions of the collectable;

apply a fifth ML model to the preprocessed image to generate a fourth score indicating centering conditions of the collectable;

assign at least one label indicating an overall condition of the collectable to the collectable based on the first score, the second score, the third score, and the fourth score; and display each defect confidence level from the plurality of defect confidence levels as superimposed on a unique portion of the preprocessed image associated that defect confidence level.

12. The non-transitory processor-readable medium of claim 11, wherein the code further comprises code to cause the processor to:
apply a computer vision model to the preprocessed image to identify at least one of a card type, player information, or character information associated with the collectable, at least one of the card type, the player information, or the character information used by at least one of the first ML model to generate the plurality of defect confidence levels, the second ML model to generate the first score, the third ML model to generate the second score, the fourth ML model to generate the third score, or the fifth ML model to generate the fourth score.

13. The non-transitory processor-readable medium of claim 10, wherein the code further comprises code to cause the processor to:
determine, for the preprocessed image, at least one of a card type, player information, or character information, the ML model further applied to at least one of the card type, the player information, or the character information to generate the plurality of defect confidence levels.

14. The non-transitory processor-readable medium of claim 10, wherein the preprocessing further includes resizing the image to cause the image to have a resolution within a predetermined resolution range.

15. The non-transitory processor-readable medium of claim 10, wherein the predetermined shape is a rectangular shape.

16. The non-transitory processor-readable medium of claim 11, wherein
the applying of the first ML model is performed prior to the applying of the second ML model, the applying of the third ML model, the applying of the fourth ML model, and the applying of the fifth ML model, and
at least two of the applying of the second ML model, the applying of the third ML model, the applying of the fourth ML model, or the applying of the fifth ML model are performed in parallel.

17. An apparatus, comprising:
a memory; and
a processor operatively coupled to the memory, the processor configured to:
augment a set of images of collectables to generate a set of synthetic images of collectables, at least one image from the set of images being shifted to generate at least one synthetic image included in the set of synthetic images;
combine the set of images of collectables and the set of synthetic images of collectables to produce a training set;
train a set of machine learning models based on the training set, each machine learning model from the set of machine learning models configured to generate a grade for an image attribute from a set of image attributes, the set of image attributes including at least one of an edge, a corner, a center, or a surface; and
execute, after training, the set of machine learning models to generate a set of grades for an image of a collectable not included in the training set.

18. The apparatus of claim 17, wherein the augmenting includes at least one of rotating a first image from the set of images, shifting the first image vertically, shifting the first image horizontally, scaling the first image, adjusting a brightness of the first image, adjusting a contrast of the first image, flipping the first image vertically, or flipping the first image horizontally.

19. The apparatus of claim 17, wherein at least one image from the set of images is captured using at least one first camera setting, and the image of the collectable not included in the training set is captured using a second camera setting different than the at least one first camera setting.

20. The apparatus of claim 17, wherein the collectables are at least one of trading cards, coins, or currency.

* * * * *